(12) United States Patent
Metzmacher

(10) Patent No.: US 8,693,090 B2
(45) Date of Patent: Apr. 8, 2014

(54) EXTREME UV RADIATION REFLECTING ELEMENT COMPRISING A SPUTTER-RESISTANT MATERIAL

(75) Inventor: Christof Metzmacher, La Calamine (BE)

(73) Assignee: Koninklijke Philips N.V., Eindhoven (NL)

( * ) Notice: Subject to any disclaimer, the term of this patent is extended or adjusted under 35 U.S.C. 154(b) by 394 days.

(21) Appl. No.: 13/000,674

(22) PCT Filed: Jul. 1, 2009

(86) PCT No.: PCT/IB2009/052855
§ 371 (c)(1),
(2), (4) Date: Dec. 22, 2010

(87) PCT Pub. No.: WO2010/004482
PCT Pub. Date: Jan. 14, 2010

(65) Prior Publication Data
US 2011/0096428 A1    Apr. 28, 2011

(30) Foreign Application Priority Data
Jul. 7, 2008   (EP) .................................. 08104648

(51) Int. Cl.
*G02B 5/08*   (2006.01)
*G02B 5/28*   (2006.01)

(52) U.S. Cl.
CPC ..................... *G02B 5/283* (2013.01)
USPC ........................................... 359/360

(58) Field of Classification Search
None
See application file for complete search history.

(56) References Cited

U.S. PATENT DOCUMENTS

| | | |
|---|---|---|
| 5,433,988 A | 7/1995 | Fukuda et al. |
| 2003/0008180 A1 | 1/2003 | Bajt et al. |
| 2003/0043456 A1 | 3/2003 | Singh |
| 2005/0027995 A1 | 2/2005 | Menschik et al. |
| 2005/0118835 A1 | 6/2005 | Kurt |
| 2005/0199830 A1 | 9/2005 | Bowering et al. |
| 2007/0081229 A1 | 4/2007 | Shiraishi |
| 2008/0149854 A1 | 6/2008 | Van Herpen et al. |
| 2008/0153010 A1 | 6/2008 | Sugiyama |

FOREIGN PATENT DOCUMENTS

| | | |
|---|---|---|
| EP | 1364231 B1 | 3/2006 |
| EP | 1675164 A1 | 6/2006 |
| EP | 1801658 A2 | 6/2007 |
| EP | 1065568 B1 | 9/2007 |
| EP | 1402542 B1 | 9/2007 |
| JP | 2006153528 A | 6/2006 |
| WO | 2006056730 A2 | 6/2006 |

*Primary Examiner* — Derek S Chapel

(57) ABSTRACT

The invention relates to an improved EUV reflecting element comprising a) a first layer essentially made out of a highly reflective material b) a second layer having a thickness of ≤5 nm and essentially made out of a material with a sputter resistance of ≤10 nm per $10^8$ shots and whereby the second layer is provided in the path of the incident and/or reflected EUV light.

7 Claims, No Drawings

EXTREME UV RADIATION REFLECTING ELEMENT COMPRISING A SPUTTER-RESISTANT MATERIAL

FIELD OF THE INVENTION

The invention relates to extreme UV radiation generating devices, especially EUV radiation generating devices which make use of the excitation of a tin-based plasma.

BACKGROUND OF THE INVENTION

This invention relates to extreme UV radiation reflecting elements of extreme UV radiation generating devices. These devices are believed to play a great role for the upcoming "next generation" lithography tools of the semiconductor industry.

It is known that for extreme ultraviolet ('EUV') light, e.g., at wavelengths of around 20 nm or less, sometimes also referred to as soft X-rays, e.g., at 13.5 nm, reflective optical elements will be needed, e.g., for collecting and focusing the EUV light generated from a plasma created from a source material. At the wavelengths involved, either grazing angle of incidence or so called normal angle of incidence reflectors will be necessary for the collection and focusing of the light emitted from the plasma. The EUV radiation can be generated by an electric discharge produced plasma ('DPP') produced by an electrical discharge between a pair of electrodes or a laser produced plasma ('LPP') produced by a focused laser beam irradiating a target material to produce the plasma.

In the process of plasma generation to achieve the emission of EUV light several severe conditions of the plasma lead to mobilization of undesirable material into the environment in the EUV light source chamber that are potentially very damaging to optical components comprising, e.g., the collector element, e.g., heat, high energy ions and scattered debris from the plasma formation, e.g., atoms or particles of source related material. The heat, high energy ions and/or source material may be damaging to the optical elements in a number of ways, including simply heating them, penetrating into them (implantation) and, e.g., damaging structural integrity and/or physical optical properties, e.g., the mechanical and optical properties of the reflector operation to reflect light at such short wavelengths, corroding or eroding them and/or diffusing into them or allow for disadvantageous intermixing of components of the reflector.

In addition, the debris management for the EUV light source chamber may result in increasing the harshness of the environment in which the reflector needs to operate.

SUMMARY OF THE INVENTION

It is an object of the present invention to provide an extreme UV radiation reflecting element which is capable of providing a good reflectivity together with an enhanced lifetime for most applications.

This object is solved by an extreme UV radiation reflecting element according to claim 1 of the present invention. Accordingly, an extreme UV radiation reflecting element is provided, comprising
   a) a first layer essentially made out of a highly reflective material
   b) a second layer having a thickness of 5 nm and essentially made out of a material with a sputter resistance of ≤10 nm per $10^8$ shots and whereby the second layer is provided in the path of the incident EUV light The term "extreme UV reflecting element" in the sense of the present invention especially means and/or includes and/or may be part of an optical component such as a reflector and/or mirror for the EUV wavelength range.

The term "highly reflective material" in the sense of the present invention means and/or includes especially that the material has a low angle (especially 10°) reflectivity in the EUV wavelength range ≥50%, more preferred ≥60%, even more preferred ≥70%, even more preferred ≥80%, most preferred ≥85%.

The term "essentially" especially means ≥75% (wt-%), preferably ≥85% (wt-%), and most preferred ≥95% (wt-%).

The use of such an extreme UV radiation reflecting element has shown for a wide range of applications within the present invention to have at least one of the following advantages:
   Due to the second layer the lifetime of the reflecting element is greatly increased without or with only little reduction in reflection.
   Due to the second layer the EUV radiation reflecting element might be less susceptible to oxidation, thus a high reflectivity is maintained
   Due to the second layer a refurbishment is easily achieved by repeated deposition of the second layer itself.
   Due to the second layer a cleaning of the EUV radiation reflecting device might be easier and less harmful to the first layer According to an embodiment of the present invention, the second layer has a thickness of ≤2 nm, preferably ≤1 nm.

According to an embodiment of the present invention, the second layer is essentially made out of a material with a sputter resistance of ≤8 nm per $10^8$ shots, more preferred ≤5 nm per $10^8$ shots.

According to an embodiment of the present invention, the first layer is essentially made out of a material selected from the group Titanium, Vanadium, Chromium, Yttrium, Zirconium, Niobium, Molybdenum, Technetium, Ruthenium, Rhodium, Palladium, Silver, Tantalum, Tungsten, Rhenium, Osmium, Iridium, Platinum, Gold, Thallium, Lead, diamond-like carbon (DLC) or mixtures and/or alloys thereof.

According to an embodiment of the present invention, the second layer is essentially made out of a material selected from the group comprising highly covalent metal oxides, nitrides, borides, phosphides, carbides, sulfides, silicides and/or mixtures thereof.

In the sense of the present invention, the term "highly covalent" especially means and/or includes a solid material whose elementary constituents have a value in the difference of electronegativity of ≤2 (Allred & Rochow), preferably in such a way that the polar or ionic character of the bonding between the elementary constituents is small.

It has been surprisingly shown that these materials are promising candidates for a second layer according to the present invention.

According to an embodiment of the present invention, the second layer is essentially made out of a material selected from the group comprising oxides, nitrides, borides, phosphides, carbides, sulfides, silicides of molybdenum, tungsten, beryllium, aluminum, erbium and/or mixtures thereof.

These materials have proven themselves in practice.

According to an embodiment of the present invention, the second layer is essentially made out of a material selected out of the group comprising tungsten, graphite, graphene, carbon composite materials and/or mixtures thereof.

The term "carbon composite materials" includes and/or means especially carbon materials such as carbon fiber-reinforced carbon (C$_f$/C) and materials where a part of the carbon has been substituted such as (but not limited to) SiC$_f$/SiC, C$_f$/SiC.

According to an embodiment of the present invention, the second layer is essentially made out of an alloy, whereby at least one component of said alloy is selected out of the group comprising molybdenum, tungsten, titane, rhenium and silicon.

These materials have proven themselves in practice.

In a more general way the present invention furthermore relates to a lithographic projection apparatus comprising
- an illumination system for supplying a projection beam of radiation;
- a first object table provided with a first object holder for holding a mask;
- a second object table provided with a second object holder for holding a substrate;
- a projection system for imaging an irradiated portion of the mask onto a target portion of the substrate; and
- at least one reflector comprising at least one extreme UV radiation reflecting element according to the present invention.

An extreme UV reflecting element according to the present invention may be of use in a broad variety of systems and/or applications, amongst them one or more of the following:
- semiconductor lithography
- metrology
- microscopy
- fission
- fusion
- soldering The aforementioned components, as well as the claimed components and the components to be used in accordance with the invention in the described embodiments, are not subject to any special exceptions with respect to their size, shape, compound selection and technical concept such that the selection criteria known in the pertinent field can be applied without limitations.

BRIEF DESCRIPTION OF THE DRAWINGS

Additional details, features, characteristics and advantages of the object of the invention are disclosed in the sub claims, and the following description of the respective examples, which—in an exemplary fashion—show several embodiments and examples of inventive reflective elements.

EXAMPLE I:

As a—merely illustrative—example, a slide with a first layer of Ru (thickness 100 nm) and a second layer of Mo (thickness 5 nm) was used as inventive Example I.

As a Comparative Example I, only a slide with 100 nm Ru was used. The reflectivity at an angle of incidence of 10° of the Inventive Example I was 97% of that of the Comparative Example I, i.e. there is hardly no change in reflectivity.

Secondly, the sputter resistivity of the Inventive and Comparative Example was measured by exposing to EUV light ($10^8$ shots).

The sputter resistivity of the inventive Example was about 2 nm (i.e. the second layer thickness was still about 3 nm), whereas the abrasion of the Comparative Example was about 20 nm. This clearly demonstrates the improved sputter resistance.

The particular combinations of elements and features in the above detailed embodiments are exemplary only; the interchanging and substitution of these teachings with other teachings in this and the patents/applications incorporated by reference are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and claims do not limit the scope of the invention as claimed.

Materials and Methods

The sputtering resistance was measured as follows:

The test sample was subjected to EUV radiation with 5 kW input power at the source, a dedicated debris mitigation system, $10^8$ pulses, sample distance to source varying from about 150-300 mm.

Afterwards, the change in layer thickness was measured by X-ray fluorescence (XRF).

The used instrument is an AXIOS 2.4 kW sequential XRF spectrometer commercially available from Panalytical, Almelo/The Netherlands operating with an Cr anode at max. 60 kV and 100 mA. The above mentioned samples are built into a sample holder. The sample and the holder are evacuated to a few Pa, set to spin rotation and the appropriate X-ray lines of e.g. Mo and Ru are measured at room temperature within a few minutes.

After the measurement of the intensities, in thin layer applications the quantification can be done by use of a physical model based on fundamental parameters. This model is based on a repeated calculation of theoretical intensities, resulting from both a dedicated layer model of the material under consideration and a simulation and description of the physical processes of X-ray interaction, in comparison with the measured intensities. The model is calibrated with at least one known sample, cross-calibrated to other techniques such as RBS and monitored and controlled regularly to guarantee the high quality of the measurements. The quantitative result delivered by the software can be expressed in composition, mass density or thickness values.

In case of the thin layers according to the present invention having a thickness of about 5 nm or less the precision is of the sputter resistance has proved in practice to be better than 0.05 nm (lower limit of detection) and accuracy is ±0.005 nm.

The invention claimed is:

1. An Extreme Ultraviolet (EUV) radiation reflection element comprising:
   - a first layer comprising a reflective material, wherein said reflective material has a reflectivity of ≥50%; and
   - a second layer including material that has a thickness ≤5 nm and a sputter resistance of ≤2 nm per $10^8$ shots, wherein the second layer is provided in the path of incident EUV light and wherein said material of the second layer is disposed on and in contact with said reflective material.

2. The EUV radiation reflecting element according to claim 1, wherein the first layer comprises a material selected from the group consisting of Titanium, Vanadium, Chromium, Yttrium, Zirconium, Niobium, Molybdenum, Technetium, Ruthenium, Rhodium, Palladium, Silver, Tantalum, Tungsten, Rhenium, Osmium, Iridium, Platinum, Gold, Thallium, Lead, diamond-like carbon (DLC) or mixtures and/or alloys thereof.

3. The EUV radiation reflecting element of claim 1, wherein the second layer comprises a material selected from the group consisting of highly covalent metal oxides, nitrides, carbides, oxinitrides or mixtures thereof.

4. The EUV radiation reflecting element of claim 1, wherein the second layer comprises a material selected from the group consisting of oxides, nitrides, borides, phosphides, carbides, sulfides, silicides of molybdenum, tungsten, beryllium, aluminum, erbium or mixtures thereof.

5. The EUV radiation reflecting element according to claim 1, wherein the second layer comprises a material selected from the group consisting of tungsten, graphite, graphene, carbon composite materials or carbon fiber materials or mixtures thereof.

6. The EUV radiation reflecting element according to claim 1, wherein the second layer comprises an alloy, wherein at least one component of said alloy is selected out of the group consisting of molybdenum, tungsten, titanium, rhenium and silicon.

7. The EUV radiation reflecting element according to claim 1, wherein the material of the second layer is molybdenurn.

\* \* \* \* \*